US012428266B2

(12) United States Patent
García Canales

(10) Patent No.: US 12,428,266 B2
(45) Date of Patent: Sep. 30, 2025

(54) FRICTIONLESS SAFETY BRAKE ACTUATOR

(71) Applicant: Otis Elevator Company, Farmington, CT (US)

(72) Inventor: Manuel García Canales, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 26 days.

(21) Appl. No.: 18/364,075

(22) Filed: Aug. 2, 2023

(65) Prior Publication Data

US 2024/0174487 A1 May 30, 2024

(30) Foreign Application Priority Data

Nov. 29, 2022 (EP) .................................... 22383150

(51) Int. Cl.
*B66B 5/18* (2006.01)
*H01F 7/20* (2006.01)

(52) U.S. Cl.
CPC *B66B 5/18* (2013.01); *H01F 7/20* (2013.01)

(58) Field of Classification Search
CPC ................ B66B 5/16; B66B 5/18; H01F 7/20
See application file for complete search history.

(56) References Cited

U.S. PATENT DOCUMENTS

| | | | |
|---|---|---|---|
| 1,839,235 A | 1/1932 | Lindstrom | |
| 6,105,738 A | 8/2000 | Christen | |
| 7,267,201 B2 | 9/2007 | Ito | |
| 7,299,898 B2 | 11/2007 | Husmann | |
| 7,398,863 B2 | 7/2008 | Liebetrau et al. | |
| 8,511,437 B2 | 8/2013 | Glaser | |
| 8,662,264 B2 | 3/2014 | Legeret | |
| 8,939,262 B2 * | 1/2015 | Schienda | B66B 5/06 187/391 |

(Continued)

FOREIGN PATENT DOCUMENTS

| | | |
|---|---|---|
| CN | 207361553 U | 5/2018 |
| CN | 111032554 B | 7/2021 |

(Continued)

*Primary Examiner* — Minh Truong
(74) *Attorney, Agent, or Firm* — CANTOR COLBURN LLP

(57) ABSTRACT

A frictionless safety brake actuator for use in an elevator system, including a triggering component moveable between a first position and a second position; a reset component movable between a normal operation position and a reset position; a biasing arrangement arranged to apply a biasing force ($F_B$) to the triggering component to bias the triggering component away from the reset component towards the first position; wherein one of the triggering component or the reset component includes a magnetic material, and the other of the triggering component or the reset component includes an electromagnet, wherein the electromagnet is operable to selectively contribute to a magnetic force ($F_R$) which acts upon the magnetic material; and a reset driver arranged to drive movement of the reset component between the normal operation position and the reset position independently of movement of the triggering component.

16 Claims, 7 Drawing Sheets

(56) References Cited

U.S. PATENT DOCUMENTS

| | | | | |
|---|---|---|---|---|
| 8,991,561 | B2 | 3/2015 | Husmann | |
| 9,027,714 | B2 | 5/2015 | Husmann et al. | |
| 9,169,104 | B2 | 10/2015 | Legeret et al. | |
| 9,206,015 | B2 | 12/2015 | Osmanbasic et al. | |
| 9,309,091 | B2 | 4/2016 | Husmann | |
| 9,850,094 | B2 | 12/2017 | Husmann | |
| 9,981,827 | B2 | 5/2018 | Osmanbasic et al. | |
| 10,023,430 | B2 | 7/2018 | Studer et al. | |
| 10,266,373 | B2 | 4/2019 | Zou et al. | |
| 10,494,227 | B2 | 12/2019 | Hu et al. | |
| 10,584,014 | B2 | 3/2020 | Fauconnet et al. | |
| 10,781,075 | B2 | 9/2020 | Witczak et al. | |
| 11,427,436 | B2 | 8/2022 | Koskinen et al. | |
| 2017/0073191 | A1* | 3/2017 | Thumm | B66B 5/18 |
| 2020/0283267 | A1 | 9/2020 | Lindström | |
| 2024/0426947 | A1* | 12/2024 | Saito | B66B 5/02 |

FOREIGN PATENT DOCUMENTS

| | | | |
|---|---|---|---|
| CN | 113165838 | A | 7/2021 |
| CN | 112110312 | B | 12/2021 |
| CN | 113994118 | A | 1/2022 |
| EP | 1562721 | B1 | 5/2006 |
| EP | 2714565 | B1 | 1/2015 |
| EP | 3789335 | A2 | 3/2021 |
| EP | 3170781 | B1 | 5/2021 |
| EP | 3519339 | B1 | 10/2021 |
| KR | 102173779 | B1 | 11/2020 |
| WO | 2021069739 | A1 | 4/2021 |
| WO | 2021160815 | A1 | 8/2021 |

* cited by examiner

FRICTIONLESS SAFETY BRAKE ACTUATOR

FOREIGN PRIORITY

This application claims priority to European Patent Application No. 22383150.4, filed Nov. 29, 2022, and all the benefits accruing therefrom under 35 U.S.C. § 119, the contents of which in its entirety are herein incorporated by reference.

TECHNICAL FIELD

This disclosure relates to elevator systems, and frictionless safety brake actuators and braking systems for use in an elevator system.

BACKGROUND

It is known in the art to mount safety brakes onto elevator components moving along guide rails to bring the elevator component quickly and safely to a stop, especially in an emergency. In many elevator systems the elevator car is hoisted by a tension member with its movement being guided by a pair of guide rails. Typically, a governor is used to monitor the speed of the elevator car. According to standard safety regulations, such elevator systems must include an emergency braking device (known as a safety brake, "safety gear" or "safety") which is capable of stopping the elevator car from moving upwards or downwards, even if the tension member breaks, by gripping a guide rail. Safety brakes may also be installed on the counterweight or other components moving along guide rails.

So-called "Electronic Safety Actuators" (ESA's) are now commonly used instead of using mechanical governors to trigger a safety brake, e.g. using electronic or electrical control. ESA's typically activate a safety brake by controlled release of a magnet (either a permanent magnet or an electromagnet) to drag against the guide rail, and using the friction resultant therefrom to pull up on a linkage attached to the safety brake. The reliance on the friction interaction between a magnet and the guide rail has a number of potential complexities, especially in high-rise elevator systems, as the interaction between the magnet and the guide rail causes wear on the guide rail, and can induce chipping, as well as debris accumulation.

There is therefore a need to improve safety actuation of the safety brakes.

SUMMARY

According to a first aspect of this disclosure there is provided a frictionless safety brake actuator for use in an elevator system. The frictionless safety brake actuator comprising: a triggering component moveable between a first position and a second position; a reset component movable between a normal operation position and a reset position; a biasing arrangement arranged to apply a biasing force to the triggering component to bias the triggering component away from the reset component towards the first position; wherein one of the triggering component or the reset component comprises a magnetic material, and the other of the triggering component or the reset component comprises an electromagnet, wherein the electromagnet is operable to selectively contribute to a magnetic force which acts upon the magnetic material; and a reset driver arranged to drive movement of the reset component between the normal operation position and the reset position independently of movement of the triggering component; wherein, when the triggering component is in the first position, the reset driver is arranged to drive a first stage of movement of the reset component from the normal operation position towards the triggering component in the first position to reach the reset position; wherein the reset driver is further arranged to drive a second stage of movement of the reset component from the reset position to the normal operation position; and wherein an attractive magnetic force acts between the magnetic material and the electromagnet at least during the second stage of movement so the second stage of movement of the reset component returns the triggering component to the second position.

The frictionless safety brake actuator disclosed herein provides a system where driven movement of a reset component in a first stage (e.g. upwards) and then back in a second stage (e.g. downwards) can reset the whole frictionless safety brake actuator in a simple manner. The combination of the first stage of movement, the second stage of movement, and the attractive magnetic force at least during the second stage of movement can be collectively referred to as the reset procedure. The second stage of movement of the reset component moves the reset component in an opposite direction to the first stage of movement. During the second stage of movement the triggering component is held in place (for example next to the reset component) by the attractive magnetic force (i.e. a magnetic force for reset), which causes the triggering component to be moved to the second position with the return of the reset component to the normal operation position.

In some examples, during the first stage of movement or the second stage of movement, the reset component is driven against the biasing force; and wherein an attractive magnetic force acts between the magnetic material and the electromagnet to oppose the biasing force at least during the second stage of movement, so the second stage of movement of the reset component returns the triggering component to the second position.

The magnetic material can be made from any material that has physical attributes that are mediated by a magnetic field created by the electromagnet, to cause the interactions and movements as outlined herein. In some examples the magnetic material is a ferromagnetic material. In some examples the magnetic material is a ferrimagnetic material. In some examples the magnetic material is a permanent magnet (i.e. a hard magnetic material), that has an associated magnetic field which produces an attractive magnetic force between the magnetic material and the electromagnet, even when the electromagnet is deactivated. In the examples where the magnetic material is a permanent magnet the magnetic forces can be contributed to by both the electromagnet and the permanent magnet, depending on the operation of the electromagnet. In some examples the magnetic material is not a permanent magnet (i.e. a soft magnetic material), so the only magnetic forces in the frictionless safety brake actuator are produced by the activated electromagnet.

The triggering component can be released from the reset component at any stage during a reset procedure, (i.e. during the second stage of movement) by selectively operating the electromagnet. This increases the safety of the system, as it is always possible for the frictionless safety brake actuator to actuate the safety brake, even if it has not been fully reset. The distance between the second position and the first position can be adjusted to match the actuation distance of any suitable safety brake.

In some examples, the triggering component is held in the second position by an opposing magnetic force being greater than the biasing force and the triggering component is released to move towards the first position by the overall opposing magnetic force being less than the biasing force.

During normal operation of the elevator system, the frictionless safety brake runs in a normal mode, where the opposing magnetic force is an attractive magnetic force (i.e. a holding magnetic force) that holds the triggering component against the biasing force of the biasing arrangement in the second position. In some examples the second position for the triggering component is next to the normal operation position of the reset component. When the frictionless safety brake actuator is activated, i.e. the safety brake needs to engage with a guide rail, the electromagnet is operated, so the biasing force becomes the dominant force in the system, and the triggering component then moves from the second position (e.g. a lower position), to the first position (e.g. an upper position), where the linkage is actuated, which in turn pulls the safety brake into engagement with a guide rail.

In some examples, the frictionless safety brake actuator can be a non-failsafe system, designed to operate with minimal power. In the non-failsafe examples, the magnetic material is a permanent magnet. The permanent magnet has a magnetic field which can produce a magnetic force on the electromagnet (when activated or deactivated).

In some non-failsafe examples, the magnetic material is a permanent magnet which produces the opposing magnetic force; and the electromagnet is operable to selectively produce a repulsive magnetic force to act against the opposing magnetic force, to result in the overall opposing magnetic force being less than the biasing force (i.e. to result in the triggering component being released to move towards the first position). In some examples the electromagnet is only operated to produce the repulsive magnetic force. In some examples the electromagnet is selectively operated to contribute to the attractive magnetic force with the permanent magnet.

It will be appreciated that, by using a permanent magnet which produces the opposing magnetic force, the frictionless safety brake actuator requires no power to the electromagnet during the normal operation of the elevator, instead it only requires power for the electromagnet for the actuation of the safety brake. Once the reset driver has driven the reset component to the reset position, the magnetic field of the permanent magnet is sufficient to hold the triggering component and the reset component together during the reset procedure. In some examples the electromagnet is selectively operated to contribute to the attractive magnetic force with the permanent magnet. In some examples permanent magnet produces the attractive magnetic force.

In some examples, the frictionless safety brake actuator can be a failsafe system, where power is required to the frictionless safety brake actuator during normal elevator operation, and when there is no power, the frictionless safety brake actuator is activated, either when the electromagnet is operated to reduce the opposing magnetic force so that it is less than the biasing force, or when there is no power to the electromagnet (e.g. the electromagnet is turned off, or there is an interruption of power to the elevator system), the triggering component will move to the first (triggered) position, and actuate the safety brake. In the failsafe examples, the magnetic material can be a permanent magnet with a field which creates a magnetic force less than the biasing force of the biasing arrangement, so as to contribute to the opposing magnetic force and the attractive magnetic force, or the magnetic material may not be a permanent magnet.

In some failsafe examples, where the magnetic material is a permanent magnet, the electromagnet is operable to contribute to the opposing magnetic force with the magnetic force created by the magnetic field of the permanent magnet. In the examples where the magnetic material is not a permanent magnet, the electromagnet is operated to produce the opposing magnetic force. In some failsafe examples, the electromagnet is operable to selectively produce the opposing magnetic force, greater than the biasing force (i.e. to keep the triggering component in the second position). In some failsafe examples the electromagnet is operable to selectively produce the attractive magnetic force (i.e. during the reset procedure, at least during the second stage of movement of the reset component). In some examples, the electromagnet is operable to selectively produce zero overall opposing magnetic force (i.e. the electromagnet is deactivated so that the triggering component is released to move towards the first position).

In the examples, where the failsafe system has a permanent magnet, the frictionless safety brake actuator can require less power to hold the triggering component in the second position than if the magnetic material is not a permanent magnet, increasing the power efficiency of the frictionless safety brake actuator In some examples of both the failsafe and non-failsafe system, the opposing magnetic force (i.e. the holding magnetic force) is the same as the attractive magnetic force (i.e. the magnetic force for reset).

It will be appreciated that the magnetic forces described can be wholly or partially created by the electromagnet. The electromagnet can be operable to contribute to the opposing magnetic force, the overall opposing magnetic force and the attractive magnetic force. The operation of the electromagnet may include activating or deactivating the electromagnet. The operation of the electromagnet may include varying the current through the electromagnet to change the magnetic force. In some examples the electromagnet is operable to produce either an attractive magnetic force on the magnetic material, or no magnetic force. In some examples, the electromagnet is operable to produce a repulsive magnetic force on the magnetic material, an attractive magnetic force on the magnetic material, or no magnetic force. In some examples the electromagnet is operable to produce a varying magnetic force across a specified range.

In some examples, the reset component comprises the magnetic material and the triggering component comprises the electromagnet. In some other examples the reset component comprises the electromagnet and the triggering component comprises the magnetic material. In the examples where the electromagnet is part of the reset component, the electromagnet is only moved in a controlled manner as part of the reset component, which can help to prevent any electrical connections from working loose with the sudden, quick, movement of the triggering component when the frictionless safety brake actuator is activated. Furthermore, the electromagnet is likely to be a heavy component, so by arranging the electromagnet in the reset component, the biasing force required to move the triggering component can be reduced, reducing the required power to the frictionless safety brake actuator.

In some examples, the reset component and the triggering component are stacked along a central axis of the frictionless safety brake actuator. In some examples, the magnetic forces and the biasing force all act along the same central axis of the frictionless safety brake actuator. By having all the forces acting along a central axis, the frictionless safety brake actuator can be made in a compact manner. This is especially advantageous if the frictionless safety brake actuator is to be placed on an elevator component with limited space near the guide rail.

In some examples the reset driver is a mechanical reset driver. The activation of the reset driver causes some form of mechanical movement which results in the first and second stages of movement of the reset component.

In some examples, the reset driver comprises a motor and a threaded shaft, and the reset component comprises a threaded core configured to be movable along the threaded shaft; and the motor is arranged to rotate the threaded shaft in a first direction to drive the first stage of movement of the reset component from the normal operation position to the reset position, and to rotate the threaded shaft in a second direction to drive the second stage of movement of the reset component from the reset position to the normal operation position. The rotation in a second direction can be in an opposite direction to the first direction.

It will be appreciated that using a threaded shaft and a motor to move the reset component means a large amount of force can be exerted on the reset component over the whole of the reset distance without the need for high power, in a reliable and easily repeatable manner.

In some examples, the reset component further comprises an anti-rotation device, to ensure the rotation of the threaded shaft in the first and second direction results in the first and second stages of movement. The anti-rotation device can prevent the reset component from spinning around the central axis of the threaded shaft during the first and second stages of movement. In some examples the geometry of the frictionless safety brake actuator ensures the rotation of the threaded shaft results in the first and second stages of movement.

In some examples, the reset driver comprises a hydraulic piston arranged to cause the first and second stages of movement. In some examples, the reset driver comprises a gas pressure piston arranged to cause the first and second stages of movement.

It will be appreciated that the biasing arrangement can be any arrangement of at least one component with a repeatable, and predictable biasing force which can cause the triggering component to move to the first position. For example, a compression spring, with a defined spring constant, may be suitable for providing the required biasing force. In some examples the biasing arrangement comprises a mechanical spring, such as a coil spring. In some example the biasing force is a magnetic force. In other examples, the biasing arrangement can be a pneumatic spring. In some examples, the biasing arrangement can be a hydraulic spring. In some examples, the biasing arrangement can be an elastomer spring.

In some examples, the at least one biasing arrangement comprises at least one compression spring. In some examples, the biasing arrangement is a compression spring located between the reset component and the triggering component. In some examples, the compression spring is a mechanical coil. The compression spring can be arranged coaxially with the reset component. The compression spring can be arranged coaxially with the triggering component. In some examples the compression spring is arranged around the reset component when in its primed (i.e. compressed) state. When the biasing arrangement is a compression spring, in the first stage of movement the reset component is driven against the biasing force of the biasing arrangement.

In some examples, the biasing arrangement comprises at least one tension spring. In other examples, the biasing arrangement is a tension spring arranged above the triggering component, and the tension spring is stretched downwards from a fixed point at the top of the frictionless safety actuator to the triggering component in its primed state. In some examples, the tension spring is a mechanical spring, such as a coil spring. The tension spring can then pull the triggering component upwards into the first position when the frictionless safety brake actuator is activated. The tension spring can be arranged coaxially with the triggering component. When the biasing arrangement is a tension spring, in the second stage of movement the reset component is driven against the biasing force of the biasing arrangement.

In some examples, the frictionless safety brake actuator further comprises a housing around the reset component, the biasing arrangement and the triggering component.

It will be appreciated that there are a variety of ways in which the movement of the triggering component can actuate the linkage. In some examples, the frictionless safety brake actuator further comprises a connection arrangement configured to connect a linkage to the triggering component, wherein the linkage is actuatable so as to move a safety brake into frictional engagement with an elevator guide rail, and wherein the triggering component is moveable between the first position in which the linkage is actuated and the second position in which the linkage is not actuated. In some examples the triggering component activates an electronic or electrical signal which causes the actuation of the linkage.

In some example, the connection arrangement is configured to connect the triggering component inside the housing to a linkage outside the housing so the linkage can move outside the housing. In some examples, the connection arrangement passes through a first slot in the side of the housing. In some examples the connection arrangement passes through the central axis of the frictionless safety brake actuator to connect to a linkage.

In some examples, the housing comprises a ferromagnetic material. When the housing is a ferromagnetic material, the housing can help confine the magnetic field(s) of the electromagnet and/or the permanent magnet, to increase the efficiency of the magnetic forces in the frictionless safety brake actuator.

In some examples, the anti-rotation device is an elastic pin fitted through the first slot, wherein the elastic pin can move vertically in the first slot, preventing any rotation of the reset component.

In some examples, the housing is configured with a geometry which acts as an anti-rotation device, which ensures that the activation of the reset driver creates the first and second stages of movement. In some examples, the housing is designed with a cylindrical geometry.

In some examples, the housing further comprises a cable opening for electrical cables which operate and/or power the electromagnet to pass through. In some examples, the electrical cables for the electromagnet are contained within the housing. In some examples, the cables for the electromagnet are fed through the central axis of the frictionless safety brake actuator.

In some examples, the electromagnet is controlled by a simple switch. In some examples the electromagnet is controlled via a controller. In some examples the frictionless safety brake actuator comprises a controller. In some examples the controller is external to the frictionless safety brake actuator. In some examples the controller controls the electromagnet. In some examples the frictionless safety brake actuator comprises a monitoring switch that can monitor the position of the triggering component and/or the reset component. In some examples the controller receives information from the monitoring switch.

According to a second aspect of the present disclosure, a braking system for use on a movable component in an elevator system is provided. The braking system comprising: a safety brake; a linkage configured to actuate the safety brake; and the frictionless safety brake actuator as described above; wherein, when the triggering component moves to the first position, the linkage is actuated so as to move the safety brake into frictional engagement with an elevator guide rail.

In some examples the linkage is connected to the triggering component via the connection arrangement.

The frictionless safety brake actuator can produce a pull force or a push force to actuate the linkage, depending on the desired configuration of the braking system.

In some examples the braking system comprises the controller. In some examples the controller monitors the state of the safety brake.

In some examples, the reset of the frictionless safety brake actuator also resets the safety brake. In some examples the safety brake requires resetting separately to the frictionless safety brake actuator.

According to a third aspect of the present disclosure, a frictionless safety brake actuator for an elevator system is provided. The frictionless safety brake actuator comprising: a triggering component; a connection arrangement configured to connect a linkage to the triggering component, wherein the linkage is actuatable so as to move a safety brake into frictional engagement with an elevator guide rail, and wherein the triggering component is moveable between a first position in which the linkage is actuated and a second position in which the linkage is not actuated; a reset component movable between a normal operation position and a reset position; a biasing arrangement arranged to apply a biasing force to the triggering component to bias the triggering component away from the reset component towards the first position; wherein one of the triggering component or the reset component comprises a magnetic material, and the other of the triggering component or the reset component comprises an electromagnet, wherein the electromagnet is operable to selectively contribute to a magnetic force which acts upon the magnetic material; and a reset driver arranged to drive movement of the reset component between the normal operation position and the reset position independently of movement of the triggering component; wherein the triggering component is held in the second position by an opposing magnetic force being greater than the biasing force, and the triggering component is released to move towards the first position by an overall opposing magnetic force being less than the biasing force; wherein, when the triggering component is in the first position, the reset driver is arranged to drive a first stage of movement of the reset component from the normal operation position towards the triggering component in the first position to reach the reset position; wherein the reset driver is further arranged to drive a second stage of movement of the reset component from the reset position to the normal operation position; wherein, during the first stage of movement or the second stage of movement, the reset component is driven against the biasing force of the biasing arrangement; and wherein an attractive magnetic force acts between the magnetic material and the electromagnet to oppose the biasing force of the biasing arrangement at least during the second stage of movement so the second stage of movement of the reset component returns the triggering component to the second position in which the linkage is not actuated.

It will be appreciated that any of the features described above with reference to the first aspect, may also be applied to this third aspect of the present disclosure.

According to a fourth aspect of the present disclosure, a braking system for use on a movable component in an elevator system is provided. The braking system comprising: a safety brake; a linkage configured to actuate the safety brake; and the frictionless safety brake actuator as described above; wherein the connection arrangement connects the frictionless safety brake actuator to the linkage, and wherein when the frictionless safety brake actuator is activated, the linkage is actuated so as to move the safety brake into frictional engagement with an elevator guide rail.

It will be appreciated that any of the features described above with reference to the second aspect, may also be applied to this fourth aspect of the present disclosure.

According to a fifth aspect of the present disclosure, an elevator system is provided. The elevator system comprising: a guide rail; an elevator component movable along the guide rail; and the braking system as described above.

In some examples the elevator component is an elevator car. In some examples the elevator component is a counterweight.

In some examples the braking system is configured to fit within an upright of an elevator car. In some examples the upright is a structural member extending along a side of the elevator car in the vicinity of the elevator guide rail. For example, the elevator car may include a car frame comprising the upright.

In some examples, the controller for the frictionless safety brake actuator and/or the braking system is integrated into a central elevator system controller.

DRAWING DESCRIPTION

Certain preferred examples of this disclosure will now be described, by way of example only, with reference to the accompanying drawings, in which.

DETAILED DESCRIPTION

Figure 1:
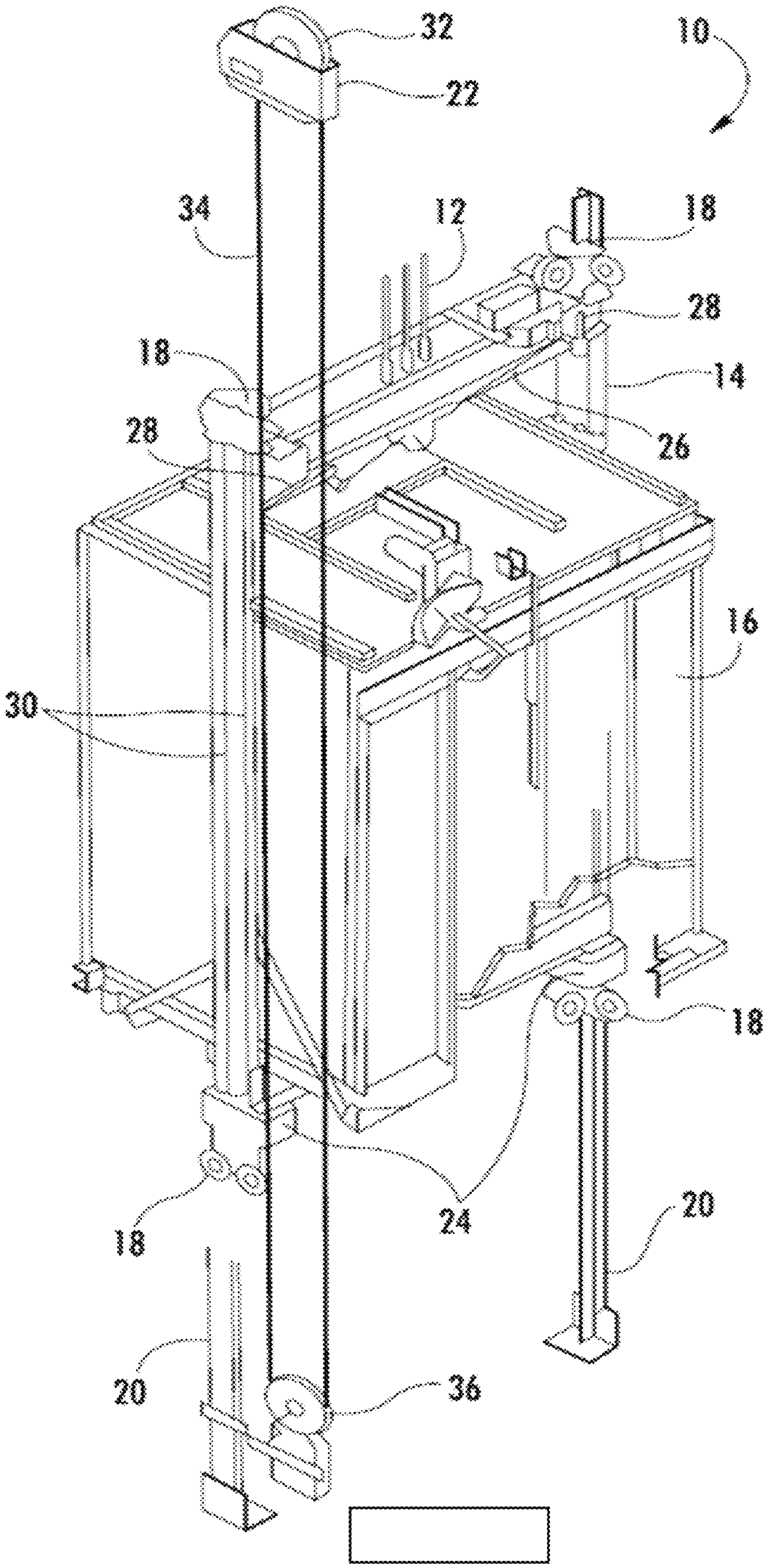
FIG. 1 shows an example of an elevator system employing a mechanical governor.

FIG. 1 shows an elevator system, generally indicated at 10. The elevator system 10 includes cables or belts 12, a car frame 14, an elevator car 16, roller guides 18, guide rails 20, a governor 22, and a pair of safety brakes 24 mounted on the elevator car 16. The governor 22 is mechanically coupled to actuate the safety brakes 24 by linkages 26, levers 28, and lift rods 30. The governor 22 includes a governor sheave 32, rope loop 34, and a tensioning sheave 36. The cables 12 are connected to the car frame 14 and a counterweight (not shown) inside a hoistway. The elevator car 16, which is attached to the car frame 14, moves up and down the hoistway by a force transmitted through the cables or belts 12 to the car frame 14 by an elevator drive (not shown) commonly located in a machine room at the top of the hoistway. The roller guides 18 are attached to the car frame 14 to guide the elevator car 16 up and down the hoistway along the guide rails 20. The governor sheave 32 is mounted at an upper end of the hoistway. The rope loop 34 is wrapped partially around the governor sheave 32 and partially around the tensioning sheave 36 (located in this example at a bottom end of the hoistway). The rope loop 34 is also connected to the elevator car 16 at the lever 28, ensuring that the angular velocity of the governor sheave 32 is directly related to the speed of the elevator car 16.

In the elevator system 10 shown in FIG. 1, the governor 22, a machine brake (not shown) located in the machine room, and the safety brakes 24 act to stop the elevator car 16 if it exceeds a set speed as it travels inside the hoistway. If the elevator car 16 reaches an over-speed condition, the governor 22 is triggered initially to engage a switch, which in turn cuts power to the elevator drive and drops the machine brake to arrest movement of the drive sheave (not shown) and thereby arrest movement of elevator car 16. If, however, the elevator car 16 continues to experience an overspeed condition, the governor 22 may then act to trigger the safety brakes 24 to arrest movement of the elevator car 16 (i.e. an emergency stop). In addition to engaging a switch to drop the machine brake, the governor 22 also releases a clutching device that grips the governor rope 34. The governor rope 34 is connected to the safety brakes 24 through mechanical linkages 26, levers 28, and lift rods 30. As the elevator car 16 continues its descent, the governor rope 34, which is now prevented from moving by the actuated governor 22, pulls on the operating levers 28. The operating levers 28 actuate the safety brakes 24 by moving the linkages 26 connected to the lift rods 30, and the lift rods 30 cause the safety brakes 24 to engage the guide rails 20 to bring the elevator car 16 to a stop.

It will be appreciated that, whilst a roped elevator is described here, the examples of a frictionless safety brake actuator described here will work equally well with a ropeless elevator system e.g. hydraulic systems, pinched wheel propulsion, systems with linear motors, and other ropeless technologies.

Whilst mechanical speed governor systems are still in use in many elevator systems, others (e.g. ropeless elevator systems without mechanical speed governor systems) are now implementing electronically or electrically actuated systems to trigger the emergency safety brakes 24. Most of these electronically or electrically actuated systems use friction between a magnet and the guide rail 20 to then mechanically actuate a linkage to engage the emergency safety brakes 24. Examples of a safety brake actuator are disclosed herein which do not utilize friction against the guide rail 20 to actuate the safety brakes 24.

Figure 2:
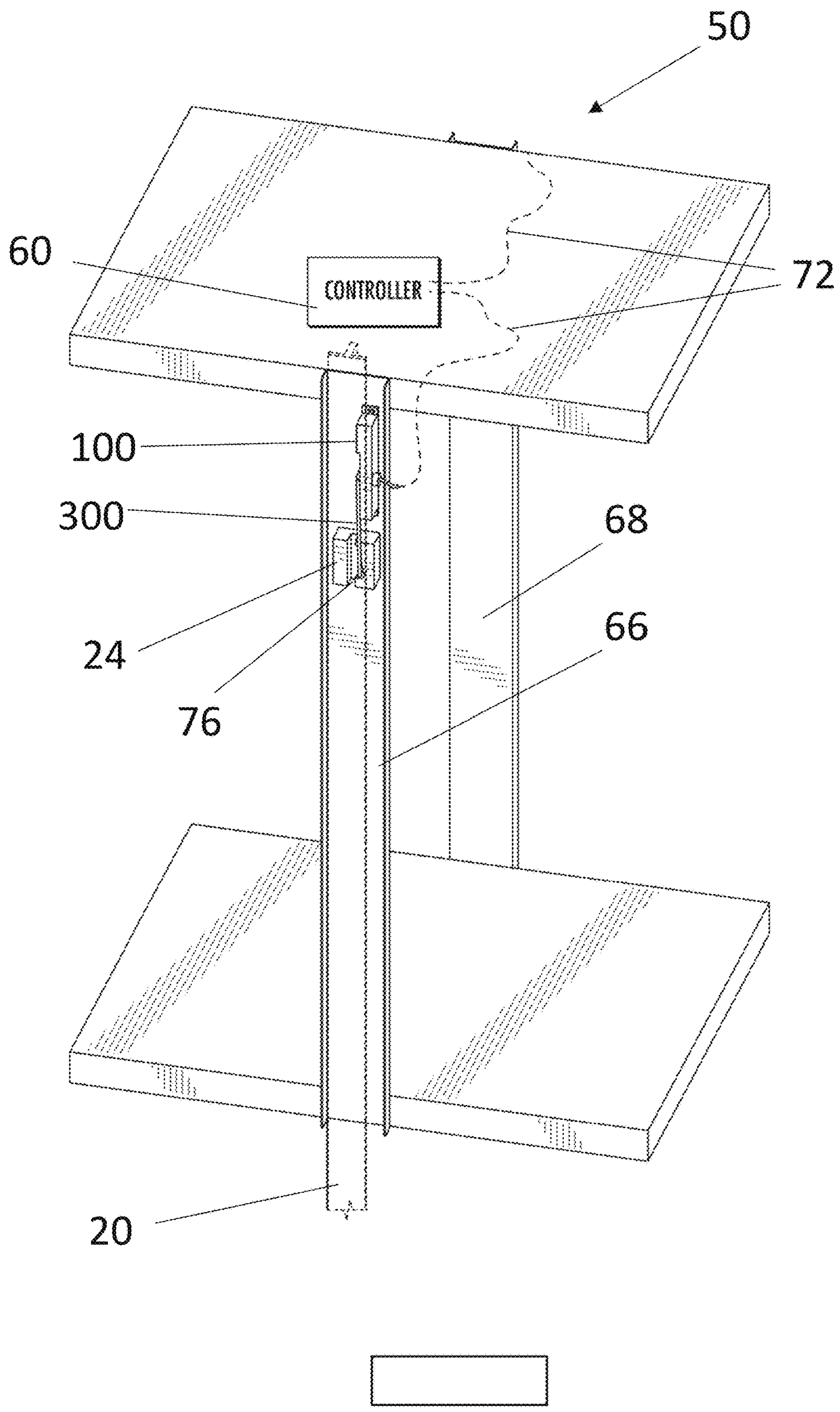
FIG. 2 shows an example of an elevator car frame including a safety brake and a frictionless safety brake actuator connected to a controller.

FIG. 2 shows an example of an elevator car frame 50 with a frictionless safety brake actuator 100 mounted thereon. The elevator car frame 50 comprises a first structural member 66 and a second structural member 68. The first and second structural members 66, 68 may be referred to as "uprights". The frictionless safety brake actuator 100 and the safety brake 24 are mounted on the first structural member 66. The frictionless safety brake actuator 100 is mechanically connected to the safety brake 24 via a linkage 300. A second safety brake actuator and a second safety brake are provided on the second structural member 68, but these are omitted for clarity. In this example, a controller 60 is mounted on the elevator car frame 50 and is in communication with the frictionless safety brake actuator 100 via connections 72.

The safety brake 24 has a slot 76 which accommodates the guide rail 20. The frictionless safety brake actuator 100 is positioned above the safety brake 24 and adjacent to the guide rail 20, although other positions are possible, e.g. the frictionless safety brake actuator 100 may be in a position that is not adjacent to the guide rail 20 as it does not require frictional contact with the guide rail 20 during its operation. In the event that the safety brake 24 needs to be engaged (e.g. in an elevator car overspeed situation), the controller 60 sends a signal to the frictionless safety brake actuator 100 to engage the safety brake 24. In response to the signal, an actuation mechanism in the frictionless safety brake actuator 100 exerts a pulling force on the linkage 300. The pulling force is transmitted via the linkage 300 to the safety brake 24, pulling the safety brake 24 into frictional engagement with the guide rail 20, bringing the elevator car frame 50 to a stop.

The frictionless safety brake actuator 100 may, for example, operate as described below with reference to FIGS. 3-7.

In the description of the following examples of frictionless safety brake actuators, the terms "left", "right", "up", "down", "above", "below" and similar positional and directional terms are used to refer to certain depicted features. These terms are used purely for convenience to refer to the position or orientation of those features when viewed in the figures, and do not necessarily imply any requirement on position or orientation of those features in frictionless safety brake actuators in accordance with the disclosure.

Figure 3:
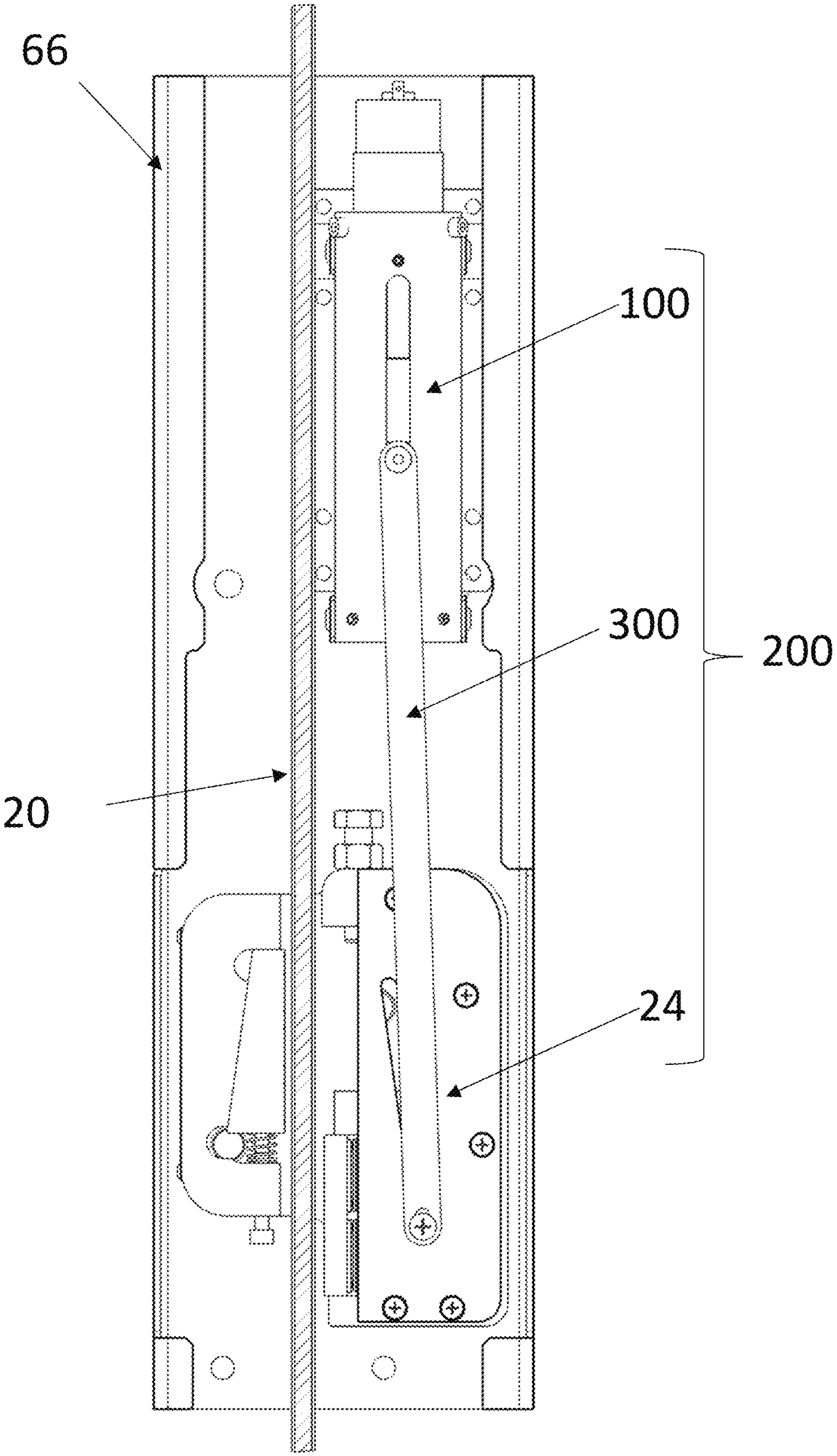
FIG. 3 shows a side view of a frictionless safety brake actuator according to an example of the present disclosure connected to a safety brake.

FIG. 3 shows an arrangement of a braking system 200 in an elevator car upright, e.g. the first structural member 66 or second structural member 68 as shown in FIG. 2, arranged in the vicinity of a guide rail 20. The braking system 200 has the emergency safety brake 24 which is actuated by a frictionless safety brake actuator 100 operating a linkage 300.

Figure 4A:
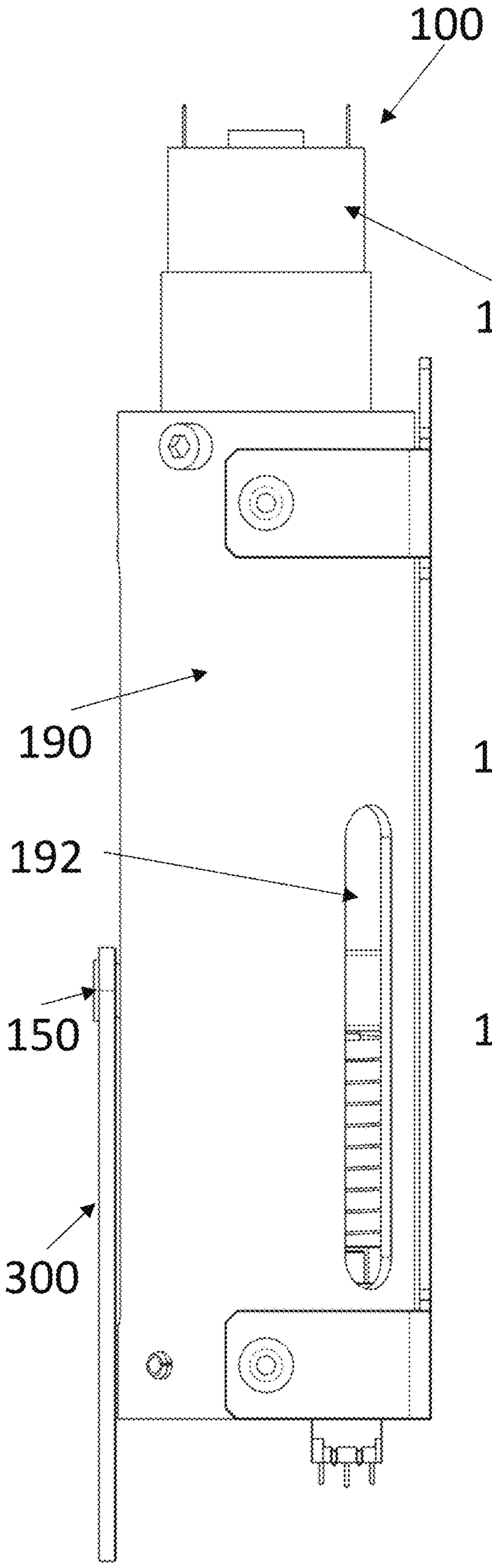
FIG. 4A shows a side view of the frictionless safety brake actuator according to an example of the present disclosure.
Figure 4B:
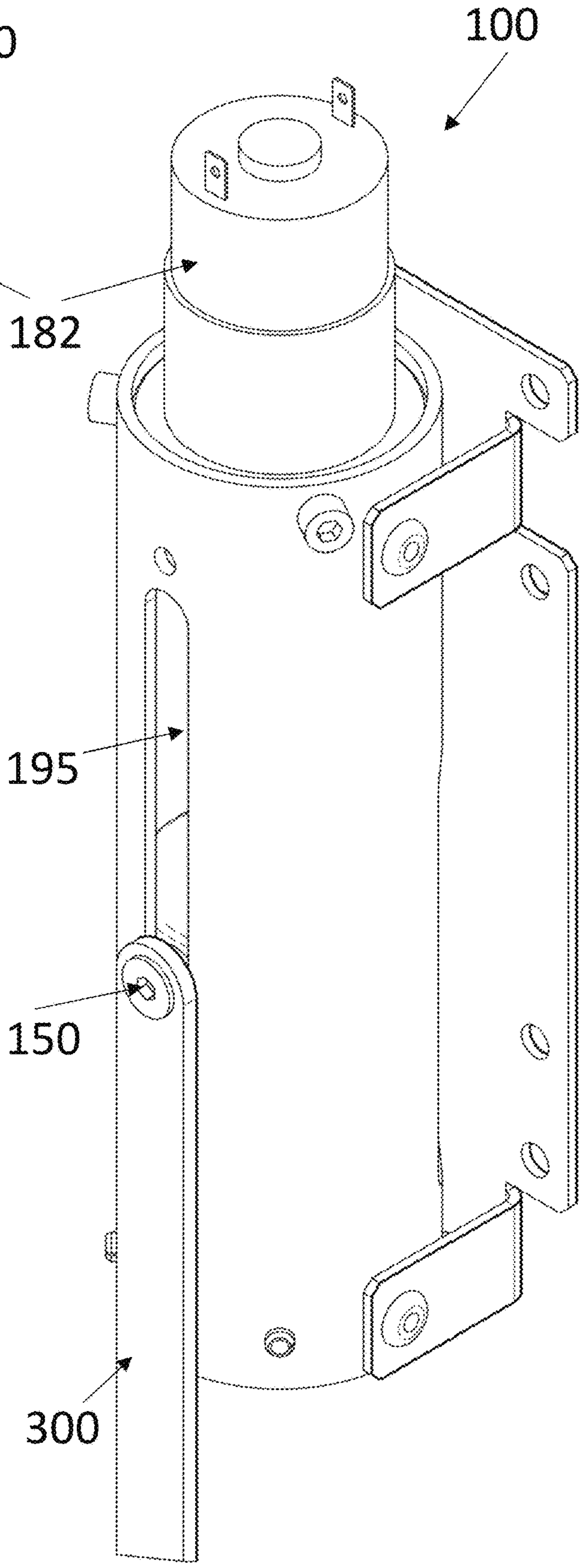
FIG. 4B shows a perspective view of the frictionless safety brake actuator of FIG. 4A.

FIGS. 4A and 4B show the frictionless safety brake actuator 100 connected to the linkage 300 via a connection arrangement 150. The frictionless safety brake actuator 100 has a housing 190 to contain any moving parts, where the housing has a slot 195 in the side through which the connection arrangement 150 passes to connect to the linkage 300. In this example, the housing 190 has a cable opening 192 through which any training electrical wires can be fed (not shown), which power and/or control the frictionless safety brake actuator 100. In some examples, trailing wires can be arranged inside the housing 190. Reset of the frictionless safety brake actuator 100 is driven by a reset driver, in this example the reset driver has a motor 182 with a threaded shaft (not shown).

Figure 5:
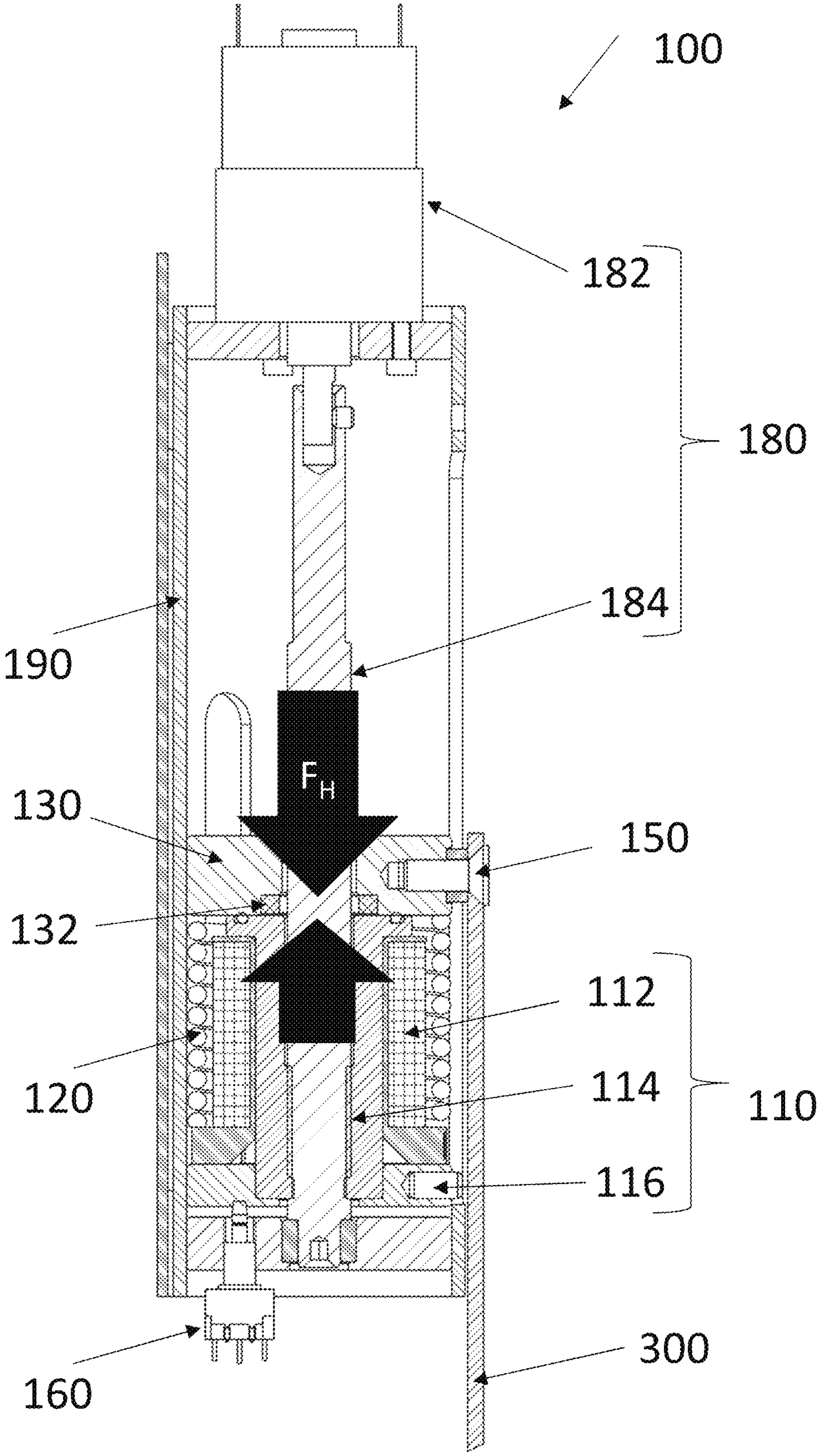
FIG. 5 shows a side view in cross-section of the frictionless safety brake actuator during normal operation.
Figure 6:
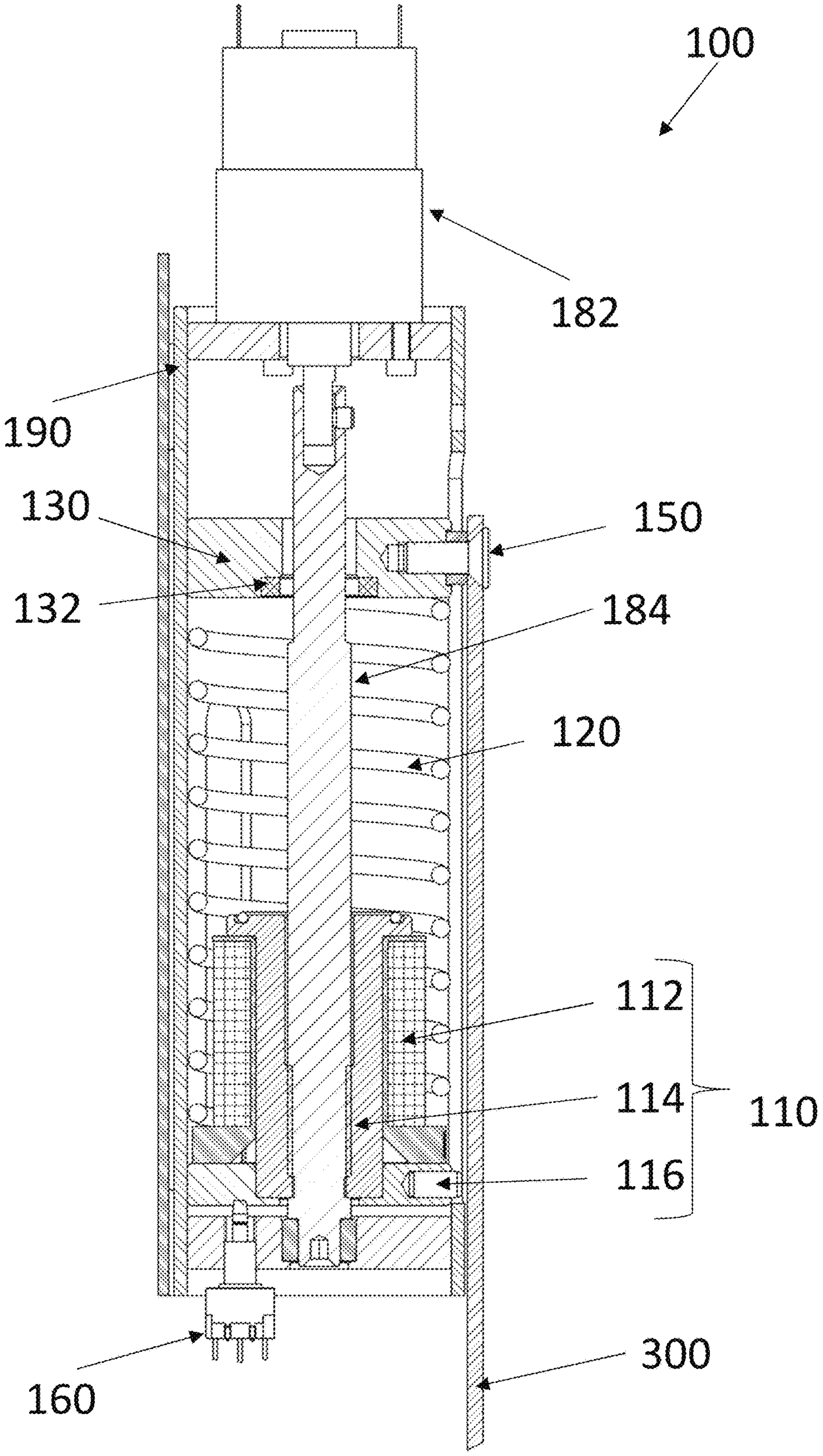
FIG. 6 shows a side view in cross-section of the frictionless safety brake actuator in the tripped position.
Figure 7:
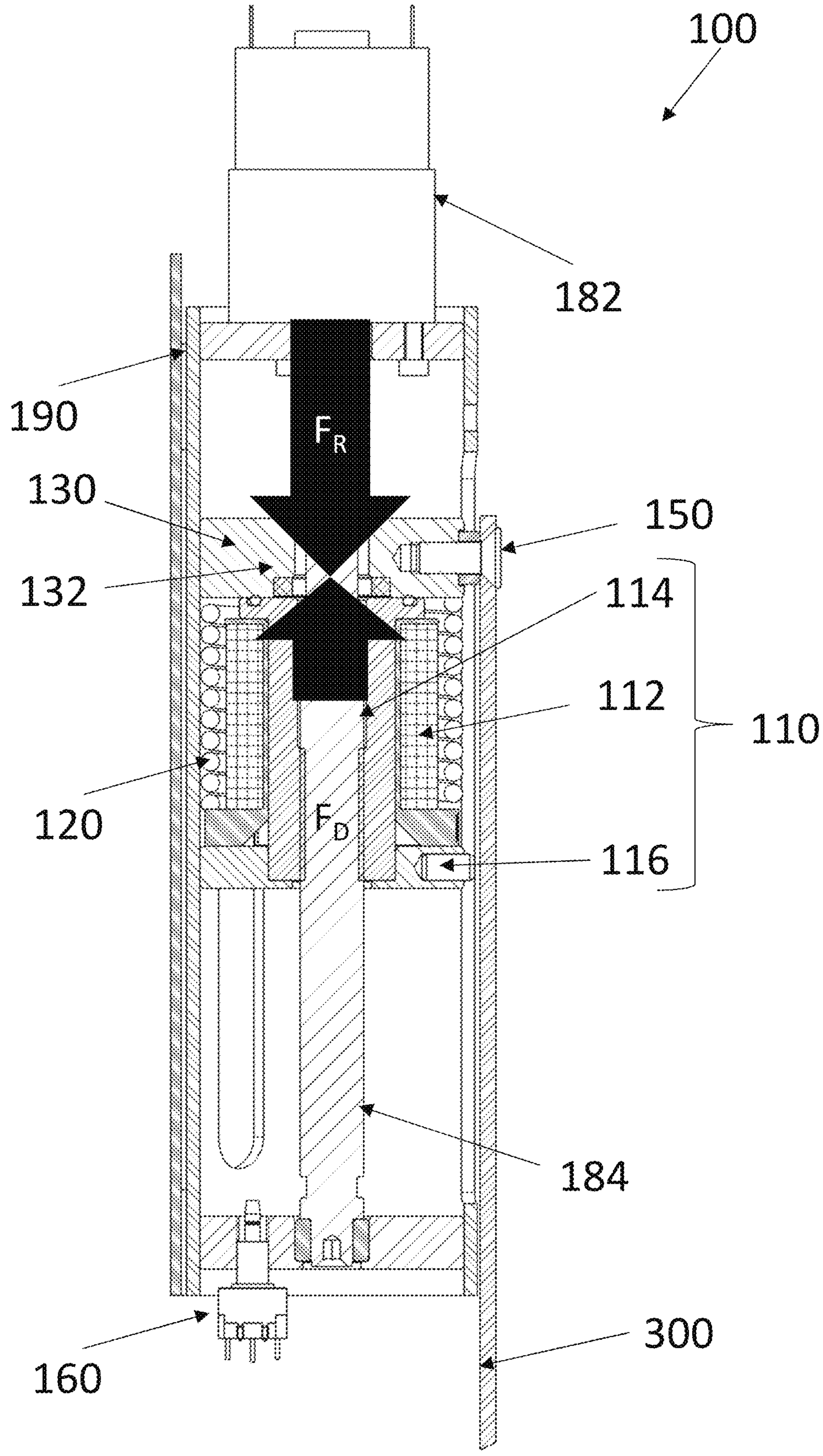
FIG. 7 shows a side view in cross-section of the frictionless safety brake actuator during the reset procedure.

FIG. 5-FIG. 7 show side sectional views of the frictionless safety brake actuator 100 of FIGS. 4A and 4B with linkage 300 and connection arrangement 150. The frictionless safety brake actuator 100 has: a reset component 110 comprising an electromagnet 112*a* threaded core 114, and an anti-rotation device 116; a compression spring 120; a triggering component 130 with magnetic material 132; a monitoring switch 160; and a threaded shaft 184, inside the housing 190, extending from the motor 182.

The skilled person will appreciate that whilst in the example shown in the figures the reset component 110 has the electromagnet 112, and the triggering component 130 has a magnetic material 132, the frictionless safety brake actuator 100 could alternatively have an electromagnet in the triggering component 130 and magnetic material in the reset component 110, as will become apparent from the foregoing description.

The threaded shaft 184 runs down the central vertical axis of the frictionless safety brake actuator 100 and is attached to the motor 182 to form a reset driver 180. The threaded shaft runs through the middle of the reset component 110 compression spring 120, and triggering component 130, where the threaded core 114 of the reset component 110 is configured to engage with the threaded shaft 184. The reset component 110 is prevented from rotating around the axis of the threaded shaft 184 by the anti-rotation device 116. The compression spring 120 and the triggering component 130 can move freely in the housing 190 without engaging with the threaded shaft 184. The frictionless safety brake actuator 100 is designed around a central vertical axis to create a compact design, where the vital moving parts (i.e. the reset component 110 and the triggering component 130) are contained in the protective housing 190, and where the motor 182 of the reset driver 180 is easily accessible for maintenance and/or replacing when necessary.

FIG. 5 shows the frictionless safety brake actuator 100 during normal operation of the elevator system. The compression spring 120 is shown in its primed state (i.e. compressed). The reset component 110 is shown at the bottom of the housing in the normal operating position, and is connected to a first end of the compression spring 120. The second end of the compression spring 120 is connected to the triggering component 130 shown next to the reset component 110 at the bottom of the housing 190 i.e. a second position. The compression spring 120 is arranged around the reset component 110 so the triggering component 140 is touching the reset component 110 during normal operation. The compression spring 120 can exert a biasing force $F_B$ upwards to push the triggering component 130 away from reset component 110 to actuate the linkage 300.

The magnetic material 132 is designed to be affected by any magnetic forces created by the electromagnet 112. In this example, the magnetic material 132 is a ferromagnetic material. The ferromagnetic material can be a permanent magnet, or it can not be a permanent magnet.

The frictionless safety brake actuator 100 can be configured for failsafe or non-failsafe operation. In the failsafe system, any interruption of power will actuate the emergency safety brake. In the non-failsafe system, power is required to actuate the emergency safety brake.

In the failsafe system, the electromagnet 112 is operated to produce a holding magnetic force $F_H$. such that the holding magnetic force $F_H$ between the electromagnet 112 and the magnetic material 132 is larger than the biasing force $F_B$ of the compression spring 120, enabling the triggering component 130 and therefore the linkage 300 to be held in place. In some examples of a failsafe system, the magnetic material 132 is not a permanent magnet. In some examples, the magnetic material 132 is a permanent magnet with a field that produces a magnetic force less than the biasing force $F_B$ of the compression spring 120. When the magnetic material 132 is a permanent magnet, the power required for the electromagnet 112 can be reduced, increasing the power efficiency of the frictionless safety brake actuator 100.

In the non-failsafe system, where the magnetic material 132 is a permanent magnet, the magnetic force $F_H$ required to overcome the biasing force $F_B$ is produced by the magnetic field of the permanent magnet, enabling the triggering component 130 and therefore the linkage 300 to be held in place. The electromagnet 112 is not activated during normal operation of the elevator system.

The skilled person will appreciate that whilst in FIGS. 5-7 a compression spring 120 is shown between the reset component 110 and the triggering component 130, other biasing arrangements may also be suitable for producing the required biasing force $F_B$ of moving the triggering component 130 away from the reset component 110 as will become apparent by the following description of the operation of the frictionless safety brake actuator 100, e.g. a tension spring located above the triggering component 130.

FIG. 6 shows a cut through of the frictionless safety brake actuator 100 with the triggering component 130 shown at the top of the housing in a first position, with the linkage 300 in the tripped position. For the brake to be tripped, an upwards force is required on the triggering component 130, to move it from the second (lower) position to the first (upper) position.

In the failsafe system, the biasing force $F_B$ of the biasing arrangement is sufficient to move the triggering component 130 upwards into the first position (i.e. the tripped position) as shown, when the electromagnet 112 is deactivated. This may be because there is no active magnetic field (i.e. the magnetic material 132 is not a permanent magnet) or because the biasing force $F_B$ produced by the compression spring 120 is larger than any magnetic force created by the permanent magnet of the magnetic material 132. Hence, when the electromagnet 112 is either triggered to be deactivated by a signal from the elevator system, or when there is an interruption of power (e.g. a power cut to a building) the triggering component 130 will be moved upwards to the first position by the biasing force $F_B$ of the compression spring 120, pulling on the linkage 300 via the connection arrangement 150, and actuating the emergency safety brake.

In the non-failsafe system, the electromagnet 112 is operated to produce a repulsive magnetic force to overcome any attractive magnetic force between the triggering component 130 and the deactivated electromagnet 110 produced when the magnetic material 132 in the triggering component 130 is a permanent magnet. In the non-failsafe system, the biasing force $F_B$ is less than the attractive magnetic force between the deactivated electromagnet 112 and the permanent magnet in the triggering component 130. In this example, no power is required to the frictionless safety brake actuator 100 during normal operation of the elevator system, instead it only requires power for the safety brake to be actuated.

The skilled person will appreciate that the repulsive force required by the electromagnet 112 will depend on the strength of the magnetic field created by any permanent magnet, and the magnetic force will vary with distance of the triggering component 130 away from the electromagnet 112. In some examples, therefore, only a short impulse of power is required from the electromagnet 112, to enable the triggering component 130 to move far enough for the biasing force $F_B$ of the compression spring 120 to overcome any magnetic forces in the system.

For the frictionless safety brake actuator 100 to be reset, the compression spring 120 must be returned to its initial primed state, and the triggering component 130 must be returned its initial position (i.e. the second position) at the bottom of the housing 190. In some examples, the reset of the frictionless safety brake actuator (100) also resets the safety brake. The principle of the reset procedure is the same for both the failsafe and non-failsafe systems.

FIG. 7 shows a cut through of the frictionless safety brake actuator 100, with linkage 300, part way through the reset procedure.

For reset to occur, the reset component 110 is driven upwards, by the reset driver 180, towards the triggering component 130, into a reset position. In this example, the movement of the reset component 110 to this position also returns the compression spring 120 to its primed state. In this example the compression spring 120 is compressed around the reset component 110.

In the example shown in FIGS. 4-7, the reset component 110 is driven upwards by the rotation of the threaded shaft 184 by the motor 182, to the position shown in FIG. 7, as the reset component 110 has threaded core 112. The anti-rotation device 116 prevents the reset component 110 from rotating with the threaded shaft 184, so the rotation of the threaded shaft 184 instead drives the reset component upwards to the reset position. In this example, the anti-rotation device 116 is an elastic pin slotted through the slot (as shown in FIG. 4B), which allows movement of the reset component in a vertical direction, whilst preventing any rotation.

The work required by the motor 182 to move the reset component 110 may be reduced by the activation of the electromagnet 112, which can produce an attractive force between the magnetic material 132 of the triggering component 130 and the reset component 110.

This initial stage of the reset procedure can occur at any time before the emergency safety brake 24 is requiring reset. In some examples, the initial stage of the reset procedure (i.e. a first stage of movement moving the reset component 110 from the normal operation position to the reset position) may occur soon after initial braking has occurred to ensure the linkage 300 is held in the actuated position, helping to keep the emergency safety brake firm in place. In this example, however, this is not necessary as the biasing force $F_B$ holds the triggering component in the top position, so the initial stage of reset is only performed when the safety brake and frictionless safety brake actuator 100 require a reset so the elevator car can move again.

To return the frictionless safety brake actuator 100 to its normal operating position (i.e. a second stage of movement), an attractive magnetic force is required between the reset component 110 and the triggering component 130. In the example shown in the figures, this ensures that when the reset component 110 is driven by the reset driver 180 in a downwards direction, the compression spring 120 remains in its primed state. In other examples, this movement downwards towards the normal operation position can also return the biasing arrangement to its primed state (e.g. a tension spring located above the triggering component 130 in the housing 190 can be stretched to its primed state by being pulled downwards).

In the example shown in FIGS. 5-7, the triggering component 130 and reset component 110 compress the compression spring of the biasing arrangement 120. To reset the frictionless safety brake actuator 110, the triggering component 130 is pulled downwards by the reset component 110, which is driven downwards by the rotation of the threaded shaft 184 by the motor 182 in the opposite direction than when the reset component 110 was moved upwards. During reset, a magnetic force for reset $F_R$ between the triggering component and the reset component must be larger than the biasing force $F_B$ of the compression spring 120.

In some examples the magnetic force for reset $F_R$ is the same as the holding magnetic force $F_H$. In some examples, the magnetic force for reset $F_R$ is larger than the holding magnetic force $F_H$. The electromagnet 112 may be activated to produce or contribute to the required the holding magnetic force $F_H$ and/or the required magnetic force for reset $F_R$.

In failsafe operation, the electromagnet 112 is activated to produce the magnetic force for reset $F_R$ between the magnetic material 132 and the electromagnet 112.

In non-failsafe operation, the permanent magnet of the magnetic material 132 produces the magnetic force for reset $F_R$. In some examples, in non-failsafe operation, the electromagnet 112 is activated to contribute to the magnetic force for reset $F_R$.

The skilled person will appreciate that the magnetic forces described can be achieved in a number of ways, depending on whether the magnetic material 132 is a permanent magnet, or not a permanent magnet, and if the magnetic material 132 is a permanent magnet, the field strength of the permanent magnet.

As will be appreciated from the description of the operation of the frictionless safety brake actuator 100, various means of control for the electromagnet 112 may be suitable. In some examples, the electromagnet 112 need only be operated with a simple switch (not shown). In some examples, the electromagnet 112 may require additional electronic control which can allow for a variable current through the electromagnet 112 i.e. via an external controller.

The frictionless safety brake actuator 100 can be monitored by a monitoring switch 160, which can detect when the frictionless safety actuator 100 is in a position for normal elevator operation i.e. when the reset component 110 is in the normal operating position, and when the triggering component 130 is in the second position. In some examples the monitoring switch 160 can detect when the triggering component 130 is not in the lower position (i.e. when it has moved away from the second position). In some examples the monitoring switch 160 can detect when the reset component 110 is not in the normal operating position. The monitoring switch 160 can feedback to an external elevator controller (not shown) to monitor if the frictionless safety brake actuator 100 is in the correct position for normal elevator operation, i.e. the reset component 110 is in the normal operating position, and the triggering component 130 is in the second (lower) position.

It will be appreciated by those skilled in the art that whilst the example shown in FIGS. 5-7 has a reset driver 180 which uses a motor 182 and a threaded shaft 184, other arrangements may also be suitable for the moving of the reset component 110 from the normal operation position to the reset position and back again.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. A frictionless safety brake actuator (100) for use in an elevator system (10), comprising:

- a triggering component (130) moveable between a first position and a second position;
- a reset component (110) movable between a normal operation position and a reset position;
- a biasing arrangement (120) arranged to apply a biasing force ($F_B$) to the triggering component (130) to bias the triggering component (130) away from the reset component (110) towards the first position;

wherein one of the triggering component (130) or the reset component (110) comprises a magnetic material (132), and the other of the triggering component (130) or the reset component (110) comprises an electromagnet (112), wherein the electromagnet (112) is operable to selectively contribute to a magnetic force ($F_H$, $F_R$) which acts upon the magnetic material (132); and a reset driver (180) arranged to drive movement of the reset component (110) between the normal operation position and the reset position independently of movement of the triggering component (130);

wherein, when the triggering component (130) is in the first position, the reset driver (180) is arranged to drive a first stage of movement of the reset component (110) from the normal operation position towards the triggering component (130) in the first position to reach the reset position;

wherein the reset driver (180) is further arranged to drive a second stage of movement of the reset component (110) from the reset position to the normal operation position; and wherein an attractive magnetic force ($F_R$) acts between the magnetic material (132) and the electromagnet (112) at least during the second stage of movement so the second stage of movement of the reset component (110) returns the triggering component (130) to the second position;

wherein the reset driver (180) comprises a motor (182) and a threaded shaft (184), and wherein the reset component (110) comprises a threaded core (114) configured to be movable along the threaded shaft (184);

a connection arrangement (150) configured to connect a linkage (300) to the triggering component (130), wherein the linkage (300) is actuatable so as to move a safety brake (24) into frictional engagement with an elevator guide rail (20), and wherein the triggering component (130) is moveable between the first position in which the linkage (300) is actuated and the second position in which the linkage (300) is not actuated;

wherein the triggering component (130) and the reset component (110) travel linearly along a common axis, the force applied by the biasing arrangement (120) is applied along the common axis and an end of the linkage (300) travels linearly parallel to the common axis.

2. A frictionless safety brake actuator (100) according to claim 1, wherein, during the first stage of movement or the second stage of movement, the reset component (110) is driven against the biasing force ($F_B$); and wherein an attractive magnetic force ($F_R$) acts between the magnetic material (132) and the electromagnet (112) to oppose the biasing force ($F_B$) at least during the second stage of movement, so the second stage of movement of the reset component (110) returns the triggering component (130) to the second position.

3. A frictionless safety brake actuator (100) according to claim 1, wherein the triggering component (130) is held in the second position by an opposing magnetic force ($F_H$) being greater than the biasing force ($F_B$) and the triggering component (130) is released to move towards the first position by an overall opposing magnetic force ($F_H$) being less than the biasing force ($F_B$).

4. A frictionless safety brake actuator (100) according to claim 3, wherein the magnetic material (132) is a permanent magnet which produces the opposing magnetic force ($F_H$); and wherein the electromagnet (112) is operable to selectively produce a repulsive magnetic force to act against the opposing magnetic force ($F_H$), to result in the overall opposing magnetic force being less than the biasing force ($F_B$).

5. A frictionless safety brake actuator (100) according to claim 3, wherein the electromagnet (112) is operable to selectively produce the opposing magnetic force ($F_H$) greater than the biasing force ($F_B$.

6. A frictionless safety brake actuator (100) according to claim 3, wherein the opposing magnetic force ($F_H$) is the same as the attractive magnetic force ($F_R$).

7. A frictionless safety brake actuator (100) according to claim 3, wherein the electromagnet (112) is operable to selectively produce a zero overall opposing magnetic force ($F_H$).

8. A frictionless safety brake actuator (100) according to claim 1, wherein the reset component (110) comprises the electromagnet (112) and the triggering component (130) comprises the magnetic material (132).

9. A frictionless safety brake actuator (100) according to claim 1, wherein the reset component (110) and the triggering component (130) are stacked along a central axis of the frictionless safety brake actuator (100); and/or wherein the magnetic forces ($F_H$, $F_R$) and the biasing force ($F_B$) all act along the central axis of the frictionless safety brake actuator (100).

10. A frictionless safety brake actuator (100) according to claim 9, wherein the motor (182) is arranged to rotate the threaded shaft (184) in a first direction to drive the first stage of movement of the reset component (110) from the normal operation position to the reset position, and to rotate the threaded shaft (184) in a second direction to drive the second stage of movement of the reset component (110) from the reset position to the normal operation position.

11. A frictionless safety brake actuator (100) according to claim 1, wherein the biasing arrangement is a compression spring (120) located between the reset component (110) and the triggering component (130).

12. A frictionless safety brake actuator (100) according to claim 1, wherein the magnetic material (132) is a permanent magnet; or wherein the magnetic material (132) is not a permanent magnet.

13. A frictionless safety brake actuator (100) according to claim 1, further comprising a housing (190) around the reset component (110), the biasing arrangement (120) and the triggering component (130).

14. A braking system (200) for use on a movable component (16) in an elevator system (10), comprising:

a safety brake (24);

a linkage (300) configured to actuate the safety brake; and a frictionless safety brake actuator (100) according to claim 1;

wherein, when the triggering component (130) moves to the first position, the linkage (300) is actuated so as to move the safety brake (24) into frictional engagement with an elevator guide rail (20).

15. An elevator system (10) comprising:

a guide rail (20);

an elevator component (16) movable along the guide rail (20); and the braking system (200) according to claim 14.

16. A frictionless safety brake actuator (100) according to claim 1, wherein the connection arrangement (150) is configured to connect the triggering component (130) inside a housing (190) to the linkage (300) outside the housing (190) so the linkage (300) can move outside the housing (190).

* * * * *